US008654180B2

(12) United States Patent
Zomet et al.

(10) Patent No.: US 8,654,180 B2
(45) Date of Patent: Feb. 18, 2014

(54) METHOD AND A SYSTEM FOR REDUCING ARTIFACTS

(75) Inventors: Assaf Zomet, Jerusalem (IL); Daniel L. Lau, Lexington, KY (US)

(73) Assignee: HumanEyes Technologies Ltd., Jerusalem (IL)

( * ) Notice: Subject to any disclaimer, the term of this patent is extended or adjusted under 35 U.S.C. 154(b) by 261 days.

(21) Appl. No.: 13/057,278

(22) PCT Filed: Aug. 4, 2009

(86) PCT No.: PCT/IL2009/000761
§ 371 (c)(1),
(2), (4) Date: Feb. 3, 2011

(87) PCT Pub. No.: WO2010/016061
PCT Pub. Date: Feb. 11, 2010

(65) Prior Publication Data
US 2011/0134223 A1    Jun. 9, 2011

Related U.S. Application Data

(60) Provisional application No. 61/085,893, filed on Aug. 4, 2008.

(51) Int. Cl.
*H04N 13/02* (2006.01)
(52) U.S. Cl.
USPC ............... 348/46; 348/E13.074; 348/E13.012
(58) Field of Classification Search
USPC .......................................................... 348/46
See application file for complete search history.

(56) References Cited

U.S. PATENT DOCUMENTS

| 6,366,281 | B1 | 4/2002 | Lipton et al. |
| 6,697,171 | B1 | 2/2004 | Carter et al. |
| 7,006,709 | B2 | 2/2006 | Kang et al. |
| 7,043,074 | B1 | 5/2006 | Darbee |
| 2006/0227427 | A1* | 10/2006 | Dolgoff ........................ 359/619 |

FOREIGN PATENT DOCUMENTS

| CN | 1902526 | 1/2007 |
| JP | 09-015530 | 1/1997 |
| WO | WO 2007/063477 | 6/2007 |
| WO | WO 2008/087632 | 7/2008 |

OTHER PUBLICATIONS

Translation of Notice of Reason for Rejection Dated Aug. 23, 2013 From the Japanese Patent Office Re. Application No. 2011-521686.
International Search Report and the Written Opinion Dated Dec. 23, 2009 From the International Searching Authority Re.: Application No. PCT/IL09/00761.
Search and Examination Report Dated Mar. 9, 2012 From the Intellectual Property Office of Singapore Issued on Jan. 23, 2012 by the Austrian Patent Office Re. 201100850-5.

(Continued)

*Primary Examiner* — Dave Czekaj
*Assistant Examiner* — Nam Pham

(57) ABSTRACT

A method for preparing an article of lenticular imaging. The method comprises receiving a plurality of source images, superimposing at least one deghosting element on the plurality of source images, the deghosting element being formed to reduce an estimated ghosting artifact from the article, interlacing the plurality of processed source images so as to form a spatially multiplexed image, and preparing the article by attaching an optical element to the spatially multiplexed image.

14 Claims, 5 Drawing Sheets

(56) References Cited

OTHER PUBLICATIONS

International Preliminary Report on Patentability Dated Feb. 17, 2011 From the International Bureau of WIPO Re. Application No. PCT/IL2009/000761.

Office Action Dated Sep. 27, 2013 From the State Intellectual Property Office of the People's Republic of China Re. Application No. 200980138956.5 and Its Translation Into English.

Search Report Dated Sep. 27, 2013 From the State Intellectual Property Office of the People's Republic of China Re. Application No. 200980138956.5 and Its Translation Into English.

* cited by examiner

METHOD AND A SYSTEM FOR REDUCING ARTIFACTS

RELATED APPLICATIONS

This application is a National Phase of PCT Patent Application No. PCT/IL2009/000761 having International filing date of Aug. 4, 2009, which claims the benefit of priority of U.S. Provisional Patent Application No. 61/085,893 filed on Aug. 4, 2008. The contents of the above applications are all incorporated herein by reference.

FIELD AND BACKGROUND OF THE INVENTION

The present invention, in some embodiments thereof, relates to system and method for reducing artifacts and, more particularly, but not exclusively, to system and method for reducing artifacts of lenticular imaging.

Generally speaking, lenticular printing is a technology in which a lenticular lens is used to produce images with an illusion of depth, or the ability to change or move as the image is viewed from different angles. Examples of lenticular printing include animation effects and modern advertising graphics that change their message depending on the viewing angle. This technology was created in the 1940s but has evolved in recent years to show more motion and increased depth.

Over the past several years various commercial lenticular software products have become available, and these programs all tend to address the creation of interlaced lenticular files. Existing lenticular printing processes introduce a host of problems in the form of moire, banding, checkerboard patterning, ghosting, and blurry images.

Few methods and system have been developed to overcome these problems. For example, International Application No. PCT/IL2008/000237 filed Feb. 25, 2008 describes a method for de-ghosting a multi image display having at least one image and a first image separating mask. The method comprises displaying a calibration pattern through an image separating mask, allowing a visual estimation of a blurring artifact brought about by a second image separating mask, and processing the at least one image according to the visual estimation, thereby reducing a ghosting artifact brought about at least by the first image separating mask. The first and second image separating masks having a substantially similar optical profile.

U.S. Patent Application Pub. No. 2009/0109490 published on Apr. 30, 2009 describes the generation of an image that comprises a plurality of interlaced images. The image is half-tone processed according to one or more processes, and printed, for example, using an inkjet printer. The halftoning is performed according a predetermined function depending at least in part on a gray scale level for a given pixel and those nearby the given pixel. The predetermined function can operate on a continuous tone version or on a printed-dot model of the image and may include a predetermined error filter where error is distributed to pixels corresponding to the same interlaced image from which the error accumulates. The image may be post-processed to arrange dots and/or shift columns of pixels to minimize overlap error or modified to include extra pixels to align the interlaced images under the lenses.

SUMMARY OF THE INVENTION

According to some embodiments of the present invention there is provided a method for preparing an article of lenticular imaging. The method comprises receiving a plurality of source images, superimposing at least one deghosting element on the plurality of source images, the deghosting element being formed to reduce an estimated ghosting artifact from the article, interlacing the plurality of processed source images so as to form a spatially multiplexed image, and preparing the article by attaching an optical element to the spatially multiplexed image.

Optionally, the superimposing comprises:
creating a plurality of pixel clusters by clustering pixels from corresponding locations in at least one area of each the plurality of source images;
applying the deghosting element on the plurality of pixel clusters; and
reconstructing the plurality of source images from the plurality of pixel clusters so as to create a plurality of processed source images superimposed with the at least one deghosting element.

Optionally, the method further comprises superimposing the at least one deghosting element according to a blur profile defining a blurring transformation.

Optionally, the superimposing comprises:
a) providing a testing image set and a plurality of deghosting measures each defined to reduce a blur profile of a different of a plurality of blurring transformations;
b) processing the testing image set with each the deghosting measure so as to create a plurality of processed testing image sets;
c) selecting a processed testing image set of the plurality of processed testing image sets;
d) identifying a deghosting measure being used for creating the selected processed testing image set of from the plurality of deghosting measures; and
e) performing the superimposition according to the identified deghosting measure.

More optionally, the selecting comprises:
presenting the plurality of processed testing image sets to a user; and
allowing a user to manually select one of the plurality of processed testing image sets.

More optionally, the selecting comprises:
capturing a plurality of image sets each of one of the plurality of processed testing image sets; and
automatically selecting the processed testing image set according to a discrepancy thereof from a characteristics of respective of the plurality of image sets.

More optionally, the providing comprises iteratively repeating a)-d) with a plurality of additional deghosting measures selected according to the identified deghosting measure.

Optionally, the superimposing comprises separately processing each color channel of the plurality of source images according to the deghosting measure.

Optionally, the method further comprises identifying at least one suspect artifact location in at least one of the plurality of source images according to the superimposing, presenting the at least one suspect artifact location to a user, and manipulating the plurality of source images according to at least one input of the user.

More optionally, the presenting comprises guiding the user how to perform the manipulating.

More optionally, the method further comprises repeating the a)-d) with the plurality of manipulated source images.

According to some embodiments of the present invention there is provided an article of lenticular imaging. The article comprises an optical element of lenticular imaging and a spatially multiplexed image interlacing a plurality of source images and attached to the optical element, the plurality of interlaced source images depicting at least one object and at least one visible inverted blur.

Optionally, the at least one visible inverted blur is created so as to reduce a ghosting effect of the article.

Optionally, a first of the plurality of source images depicts the object and a second of the plurality of source images depicting the visible inverted blur.

Optionally, the plurality of interlaced source images depicting at least one object and at least one visible inverted blur when deinterlaced.

Optionally, the visible inverted blur comprises at least one imposition of an inverse version of the object on at least one of the plurality of source images.

Optionally, the optical element is selected from a member of a group consisting of fly's eye lenslet, a square lenslet, a hexagonal lenslet, a triangular lenslet, a diamond packed lenslet, an optical barrier, and a parallax barrier.

According to some embodiments of the present invention there is provided a system for preparing an article of lenticular imaging. The system comprises a data input unit for receiving a plurality of source images, a processing unit for superimposing at least one ghosting measure on each the source image and for interlacing the plurality of superimposed source images to form a spatially multiplexed image, and a printing unit for printing the spatially multiplexed image so as to allow the preparing the article by attaching an optical element thereto.

Optionally, the at least one deghosting element are generated when applying a deghosting measure generated to reduce a blur profile defining a blurring transformation.

More optionally, the system further comprises a printing unit for printing an effect of a plurality of deghosting measures, each generated according to a different of plurality of profile blurs, to a user and receiving a selection of one of the plurality of profile blurs in response, the processing unit configured for processing the source images according to the selected deghosting measure.

More optionally, the system further comprises a man machine interface (MMI) for presenting at least one suspect artifact in at least one of the plurality of source images and receiving a user manipulation in response, the processing unit configured for processing the source images according to the user manipulation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
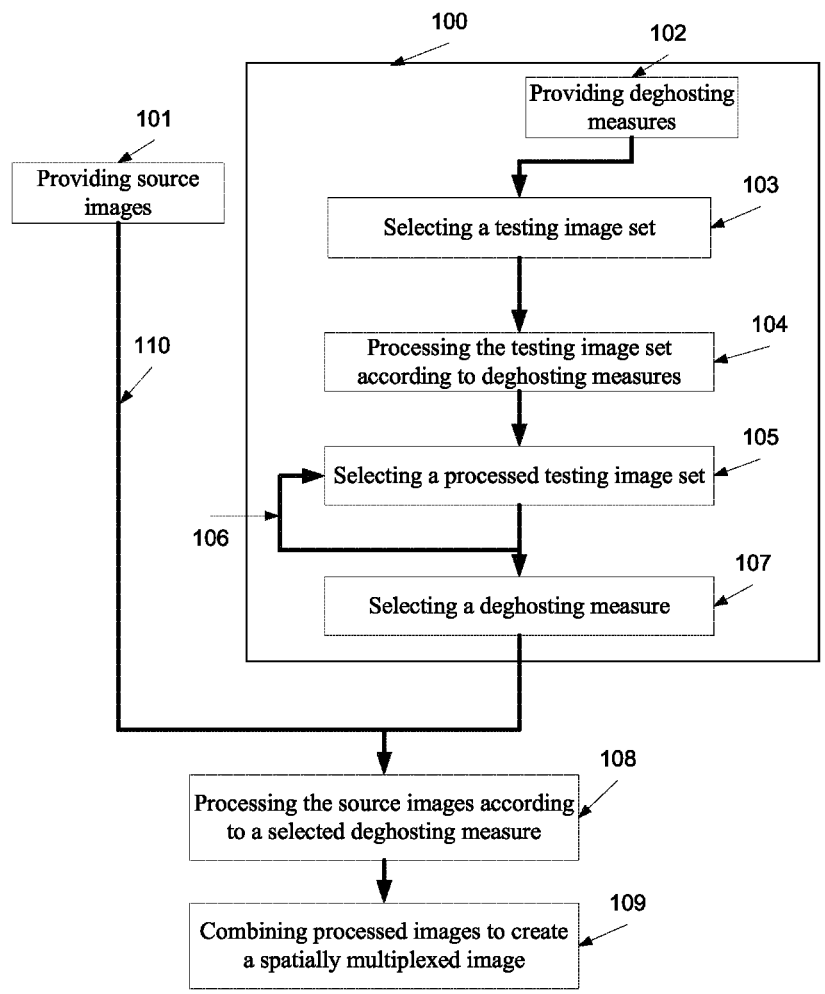
FIG. 1 is a flowchart of a method for generating a spatially multiplexed image, according to some embodiments of the present invention.

DESCRIPTION OF SPECIFIC EMBODIMENTS
OF THE INVENTION

The present invention, in some embodiments thereof, relates to system and method for reducing artifacts and, more particularly, but not exclusively, to system and method for reducing artifacts of lenticular imaging.

According to some embodiments of the present invention there is provided a system and a method of creating an article of lenticular imaging having minor or no ghosting artifacts. The article is based on a spatially multiplexed image that is created by interlacing a plurality of source images. Before the interlacing is performed, one or more deghosting element are superimposed on one or more of the plurality of source images according to a deghosting measure that is optionally based on a selected blur profile defining a certain blurring transformation. The deghosting measure is formed to remove artifacts which are expected to appear when a viewer views an article that is based on the processed source images. Optionally, the deghosting measure is selected, manually or automatically, from a plurality of deghosting measures, each created to reduce or remove a different blur profile, which their effect is presented to the user and/or to an image sensor.

Additionally or alternatively, the source images may be manipulated according to a feedback that is based on the processing of the source images. In use, the processing of the source images identifies and marks suspect artifact locations. The suspect artifact locations are then displayed to a user, such as a content designer. Such a presentation allows the user to manipulate the source images in a manner that reduces artifacts, such as ghosting artifacts. Optionally, the manipulated source images are separately processed and interlaced to create a spatially multiplexed image for an article of lenticular imaging with little or no artifacts.

According to some embodiments of the present invention there is provided an article of lenticular imaging having a spatially multiplexed image that is interlaced from a plurality of source images having one or more visible deghosting elements which may be considered as an inverted blur or an inverse version of objects which are depicted in the source images. It should be noted that an inverse version is created by inverting the pixel values of an object and possibly applying additional monotone operations on the pixel values such as scaling and/or exponent Optionally, the visible inverted blur is one or more superimposed shadows objects and of inverse objects which are depicted in the source images. It should be noted that such shadows are created as an outcome of the deghosting method that is outlined above and described below.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method 100 of generating a spatially multiplexed image for creating an article of lenticular imaging, according to some embodiments of the present invention. The spatially multiplexed image, which may be referred to as an interlaced image, is designed for usage in conjunction with lens arrays such as lenticular, fly's eye, square, hexagonal, triangular, and/or diamond packed lenslet configurations, an optical barrier, a parallax barrier, and/or any other display panel for displaying multiple images, such as stereoscopic images, for brevity hereafter referred to as a lenticular element or lenticular. Optionally, the image separating mask having a plurality of interlaced images that form a vertical and/or a horizontal structure, optionally periodic, for channeling images in a plurality of directions.

According to some embodiments of the present invention, the method 100 is based on a deghosting measure that is identified and/or selected from a set of deghosting measures. The selected deghosting measure defines a transformation that is used to reduce ghosting artifacts from the lenticular article that is created from a set of source images, for example as described below. The source images are selected to be interlaced so as to create a spatially multiplexed image. The image transformation reduces potential artifacts, such as ghosting artifacts and blurriness of in-depth objects from the article of lenticular imaging that is based on the spatially multiplexed image. For brevity, the process of removing or reducing these ghosting artifacts is referred to herein as deghosting. It should be noted that the set of source images may include different number of images, for example 2, 4, 6, 8, and 12. Optionally, the source images include one or more copies of the same image. For example a set of six original images may be duplicated to create a set of twelve original images.

The deghosting may be implemented by separately applying the deghosting measure on clusters of corresponding pixels of the source images. The deghosting reduces the blur that is brought about by printing artifacts, paper quality artifacts, and/or artifacts which are brought about by a lenticular and/or a projecting element.

As shown at 101, a set of source images, which are selected and/or received to be interlaced so as to create a spatially multiplexed image for an article of lenticular imaging, are provided. For clarity, M denoted the number of source images and $I_1 \ldots I_m$ denotes the source images. Optionally, M is defined for a pre-selected number of source images which are selected to be interlaced.

Now, as shown at 110, a deghosting measure, which is optionally created according to a certain blur profile, is provided. The processing of the source images according to the deghosting measure superimpose one or more deghosting element thereon, Sub-blocks 102-107 describe a process of selecting a deghosting measure from a set of deghosting measure s. For clarity, $B_1 \ldots B_n$ denote the provided deghosting measures, each defined to reduce the artifacts of a different blur profile. Optionally, some or all of the blur filters are convolution kernels which are convoluted on clusters of pixels of the source images. The convolution kernels may have a parametric form shape, for example a Gaussian kernel with a zero mean. Such kernels may be formed by discrete sampling of a parameter space of a parametric form, for example, the standard deviation of the Gaussian with values of 0.1, 0.5, 1, and 2 pixels.

As shown at 103, a testing image set $I_t$ is provided, automatically or manually. Optionally, the testing image set is selected from a set of images that are similar to the source images so as to exemplify the effect of the blur profiles in an effective manner. Now, as shown at 104, the testing image set is separately processed by each one of the deghosting measures $B_1 \ldots B_n$. $I_t$ is separately deghosted to create processed testing image sets denoted herein by $I_t B_1 \ldots I_t B_n$.

Now, as shown at 105, a deghosting measure is selected. Optionally, the deghosting measure is selected manually. In such an embodiment, each new set of processed testing image sets $I_t B_1 \ldots I_t B_n$, is presented, either simultaneously or sequentially, to the user. Optionally, the sets are printed by a printer that is connected to a client terminal, such as personal computer, a laptop, a personal digital assistant (PDA), a server, a kiosk in a photo shop, a Smartphone and any computing unit. This allows the user to view the prints via a respective lenticular element and to select the processed testing image set that is most visually appealing to her, most clear to her and/or with a lowest or no ghosting or deghosting artifacts.

According to some embodiments of the present invention, the deghosting measure is selected automatically. First, a set of processed testing image sets, for example $I_m B_1 \ldots I_m B_n$, is selected. The selected sets are each interlaced to create a spatially multiplexed image. These spatially multiplexed images are placed on the flat side of the lenticular element captured by an optical sensor, such as a CCD based and/or a CMOS based camera. Now, the at least one captured image of each processed testing image set may be aligned to the corresponding source image, for example according to a geometric alignment, a geometric affine alignment, and/or a photometric alignment of image color mean and variance, for example as described in International Application No. PCT/IL2008/000237 filed Feb. 25, 2008 and/or in U.S. Pat. No. 6,460,993 filed on May 23, 2001, which are incorporated herein by reference. Then, each one of the source testing image is matched with a respective captured, and optionally aligned, processed testing image sets. The match allows calculating one or more discrepancy measures between them.

Optionally, one of the discrepancy measures is a sum of squared differences between the color values of the images. In such an embodiment, the processed testing image set that is matched to produce the discrepancy measures indicating a minimal discrepancy is selected as the most visually appealing image. Now, the deghosting measure that has been used for creating it is traced and selected, as shown at 107.

Optionally, as shown at 106, the process of selecting a deghosting measure is iterative. In such an embodiment, the blur profiles are created by changing parameters of a convolution kernel. After the deghosting measure is selected, intermediate parameters are used for creating an additional set of deghosting measures. Each member of this additional set of deghosting measures is separately applied on the one or more testing image sets in a similar manner. This process may be repeated, in a similar manner, with further intermediate parameters, and so on and so forth. Additionally or alternatively, one or more of the deghosting measures are associated with a set of refined blur parameters. After one of the deghosting measures is selected, the testing image set is processed with the refined blur parameters so as to create a new set of processed testing image sets, for example similar to the described in relation to 104. Now, a deghosting measure may be selected. Optionally, each refined deghosting measure has a set of further refined deghosting measures, and so on and so forth. Such iterative processes allow increasing the quality of the blurring transmission and/or reducing the computational complexity that is involved in the process.

Now, as shown at 108, the source images are processed by the selected deghosting measure. Optionally, the image a viewer looking at an article of lenticular imaging having the spatially multiplexed image from an angle where she ought to see image $I_k$ is defined as follows:

$$J_K(x, y) = \sum_{G=1}^{M} \alpha_{mod(G-k,M)+1} I_G(x, y) \quad \text{Equation 1}$$

where $I_1 \ldots I_M$ denotes the source images, as described above, mod denotes modulo operation, $\alpha$ denotes coefficients of an estimated blur of a spatially multiplexed image that is generated from interlacing the M selected source images. I other words, rather than seeing the image $I_K$, as desired, the viewer sees $J_K$ which is a mix (blur) of the source images $I_1$, $I_2, \ldots, I_M$.

According to this embodiment, the deghosting elements, which are shadows of objects in the source images, may be superimposed in the processed source images. The deghosting elements are optionally based on negative coefficients of the inverse of an estimated blur, such as the alpha coefficients in Equation 1. An example to such superimposed images is provided in FIGS. 3 and 4. It should be noted that such deghosting elements are visible when deinterlacing an article generated by these processed source images. Optionally, the alpha coefficient is set to a parametric form, for example a linear exponential form in a subscript value $\alpha_p = k^P$, where k denotes the parameter. Optionally, the parametric form is set as c+g where c denotes a constant function and g denotes a zero-mean Gaussian having the Gaussian variance and the value of c as parameters and the alpha values are scaled, for example to sum 1.

According to some embodiments of the present invention, corresponding pixels of the source images are clustered before processing. In such an embodiment all the source images have, or processed to have, a common resolution. In such a manner, each pixel of a certain source image has corresponding pixels in the other source images. In use, all the corresponding pixels are clustered together, for example from creating a vector. Now, each one of the clusters is processed to reduce the effect ghosting artifact, for example by applying a high pass filter. Now, a reconstruction of the source images from the cluster allows creating processed source images with one or more deghosting elements. These images allow creating a spatially multiplexed image that has reduced ghosting artifacts when combined with a lenticular element to create a lenticular imaging article.

In such an embodiment, Equation 1 may be rephrased as:

$$\begin{bmatrix} I_1(x, y) \\ \vdots \\ I_M(x, y) \end{bmatrix} = A \begin{bmatrix} L_1(x, y) \\ \vdots \\ L_M(x, y) \end{bmatrix} \quad \text{Equation 2}$$

where A denotes a matrix defined by the coefficients $\alpha$, $L_1 \ldots L_M$ denotes a set of images that is generated by processing the source image with the selected deghosting measure, referred to herein as the processed source images and (x,y) denotes a corresponding pixel location in each one of the M source images and M processed source images. The M processed source images are the images which are later interlaced to create the spatially multiplexed image.

The deghosting measure that is applied on the pixels allows deghosting, deblurring, and/or performing a blur reduction may be performed by solving for values in $L_G$ where $G=1 \ldots M$ according to the values of $I_k$. Optionally, in order to reduce the blur effect that is caused by the blur profile to the display, some of the values of the source images are recovered by one or more linear combinations of values from the different processed source images.

In some embodiments of the present invention embodiment, the processed source images are obtained by solving Equation 3 for $L_G$ are projected to create a set of printable images. Optionally, such a conversion includes converting negative pixel values to zero and clipping down pixel values which are above a certain threshold that represents the maximal printable pixel value, for example the maximal possible value for printing 8-bit images is 255.

It should be noted that reducing ghosting artifact may be performed by processing the interlaced image, for example as described in PCT/IL2008/000237 filed Feb. 25, 2008. In such a process each row or column of the interlaced may be processed as a whole, depending on the interlacing arrangement.

As in the aforementioned embodiments the deghosting is performed on the source images themselves and not on the interlaced image they create. As described above, the processing is performed by collecting corresponding pixels of the source images into vectors, processing these vectors, creating the processed source images from the vectors and then interlacing the processed source images. This process allows reducing computational complexity in relation to deghosting processes which are applied on an interlaced image. When an interlaced image is deghosted, all the pixels in a row or a column are coupled in a common convolution equation. Hence, either iterative methods and/or global solutions are used. In contrast, when the deghosting is performed on clusters of pixels of source images, such as the aforementioned the vectors, the inversion is performed by pre-computing matrices, for example pseudo-inverse matrixes, as described in Equations 5 and 6. In such an manner, the computation only amounts to a one-time matrix multiplication per matrix per vector. Another computational benefit for deghosting the vectors is that it lends itself easier for implementing more sophisticated computations such as constrained L1 optimization which is described below.

Now, as shown at 109, the processed source images are interlaced to create a spatially multiplexed image. By attaching the spatially multiplexed image to a lenticular element, a lenticular imaging article is created.

Figure 2:
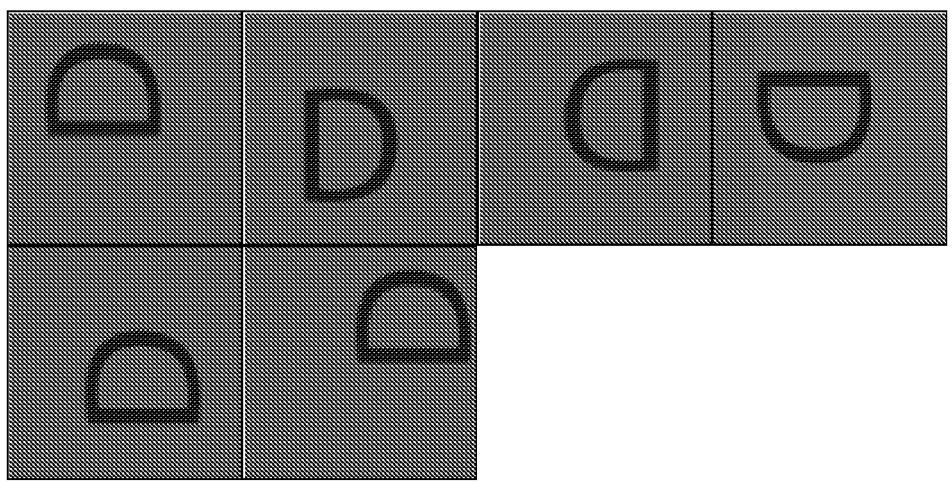
FIG. 2 is a schematic illustration of a set of exemplary source images.
Figure 3:
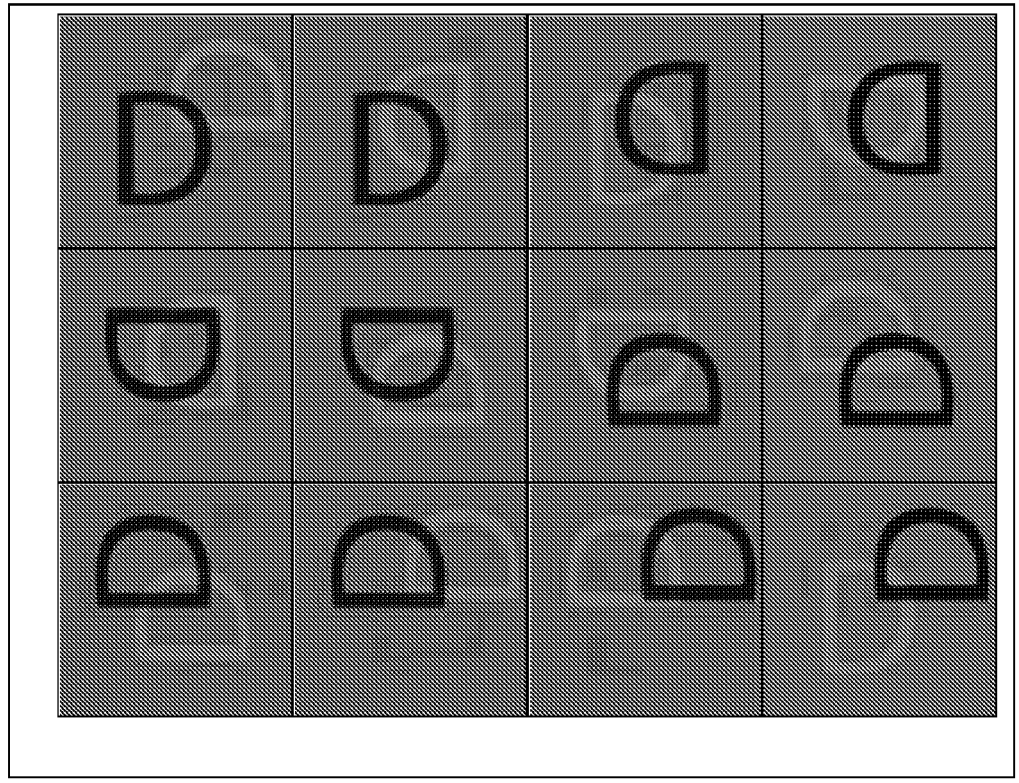
FIGS. 3 and 4 are schematic illustrations of sets of processed images, which are generated from the set of exemplary source images that is depicted in FIG. 2, according to some embodiments of the present invention.
Figure 4:
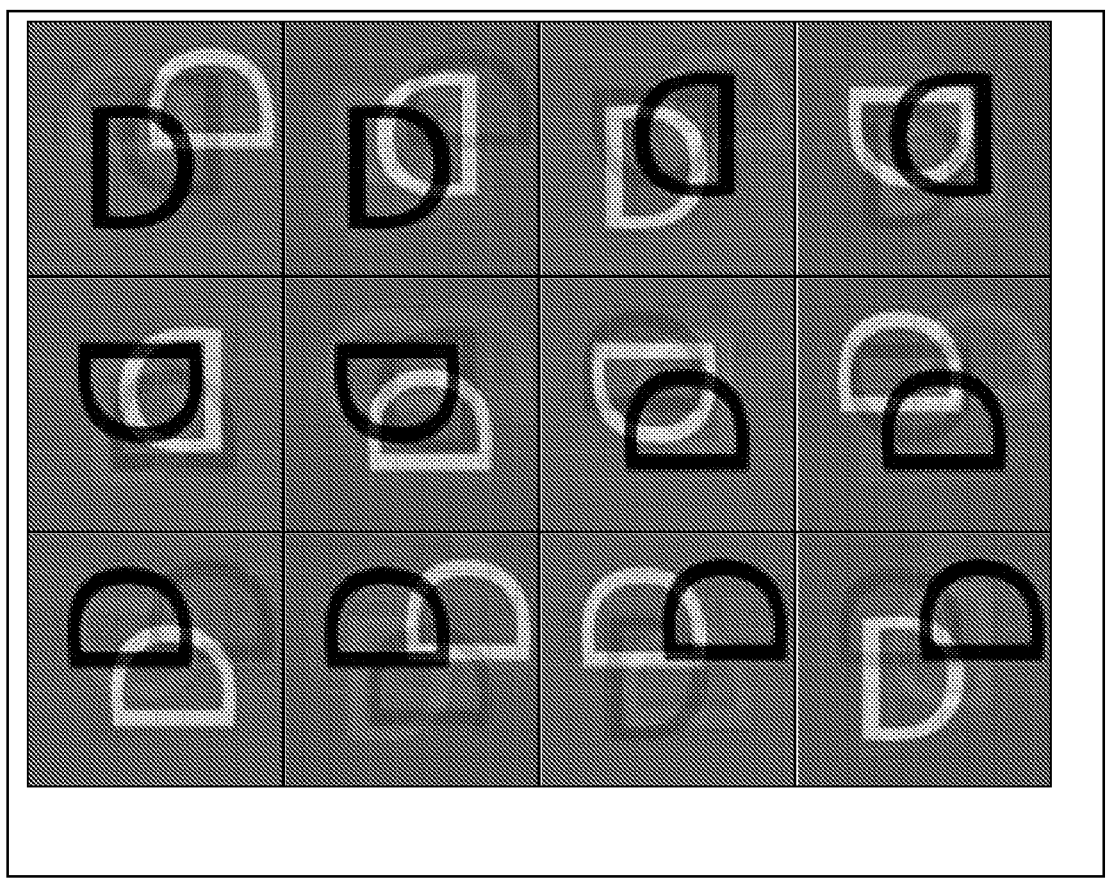

Reference is now also made to FIG. 2, which is a set of exemplary source images and to FIGS. 3 and 4, which are schematic illustrations of sets of processed images which are generated from the set of exemplary source images, according to some embodiments of the present invention. The set of exemplary source images includes 6 source images that are processed, as shown at 108. As an outcome of the deghosting of the source image, deghosting elements, such as shadows, are superimposed in the processed source images, for example as depicted in FIGS. 3 and 4.

FIG. 2 depicts an exemplary object 201. As depicted in FIGS. 3 and 4, the deghosting that is applied on the source image depicted in FIG. 2 create inverted blur 202. The inverted blur is shaped to remove the ghosting artifacts that could have been formed on a spatially multiplexed image that is based on these source images. Such inverted blur is created as defined in Equation 1 or in Equation 4: and/or modeled by the aforementioned matrices A or Z. Optionally, as shown in FIGS. 3 and 4, the inverted blur includes one or more exemplary shadow objects, which are optionally created according to negative coefficients of the inverse of an estimated blur, which are superimpositions of the object depicted in the source images.

In such an embodiment, the processing allows generating a spatially multiplexed image from a plurality of images with visible inverted blur, such as one or more shadow objects.

Reducing Number of Source Images

According to some embodiments of the present invention, the number of source images which are used for creating the spatially multiplexed image is reduced. Optionally, a set of linear equations is narrowed for one or more pixels (x,y) so as to account for only a subset thereof, for example as follows:

$$\begin{bmatrix} I_{q1}(x, y) \\ \vdots \\ I_{qk}(x, y) \end{bmatrix} = Z \begin{bmatrix} L_1(x, y) \\ \vdots \\ L_M(x, y) \end{bmatrix} \qquad \text{Equation 4}$$

where $q_1, \ldots, q_k$ denotes selected rows of matrix A from Equation 2 and Z denotes a matrix containing only these selected rows.

For example, the spatially multiplexed image is an image that provides a flip graphical effect between first and second images and M=12. Source images $I_1, I_6$, are of the first image and source images $I_7, \ldots, I_{12}$ are of the second image. In such an embodiment, $q_1 \ldots, q_k$ may be $I_1, I_2, I_3, I_7, I_8$, and $I_9$.

In some embodiments of the present invention, a constrained optimization is performed on Equation 4 to include a constraint requiring that values of the processed source images $L_1(x,y), \ldots, L_M(x,y)$ are within a selected domain, for example the printable domain. Such constrained optimization is solved in some embodiments using standard linear programming optimization tools. Optionally, equations for different color channels in the processed source images are simultaneously solved by separately applying Equation 4 to each individual color channel in an equation system. Examples for color channels are Red, Green, Blue (RGB) channels, Hue, Luminance, Saturation (HLS) channels, and Hue, Saturation, Value (HSV) channels. Additionally or alternatively, a constraint is added to bind different color channels. Such a constraint may be implemented by selecting interpolations of values from the sources images as values of color channels. The constraint may be implemented by defining a linear programming problem with the following variables:

M·C variables for the values of C channels in M source images. The variables are constrained between 0 and an a maximum threshold, optionally the highest possible value, for example 255 for 8-bit images; and M-k variables for the interpolation constraints, denoted as $g_j$ optionally constrained between 0 and 1.

Optionally, the indices of the variables j correspond to the complementary views to q1, . . . , qk.

Equations defining color values as interpolations for a given pixel location (x,y) in a given source image v, are defined for at least one channel c as follows:

$$I_{v,c}(x,y) = A_{v,c}(x,y) + (B_{v,c}(x,y) - A_{v,c}(x,y))g_v(x,y)$$

According to some embodiments of the present invention, values of the processed source images $L_1(x,y), \ldots, L_M(x,y)$ may be acquired in a two steps process. At first, an initial solution $L^0(x,y)$ is provided by using the pseudo inverse of matrix Z:

$$Z^T(ZZ^T)^{-1} \begin{bmatrix} I_{q1}(x, y) \\ \vdots \\ I_{qk}(x, y) \end{bmatrix} = \begin{bmatrix} L_1^0(x, y) \\ \vdots \\ L_M^0(x, y) \end{bmatrix} \qquad \text{Equation 5}$$

which may be represented as follows:

$$L = \begin{bmatrix} L_1(x, y) \\ \vdots \\ L_M(x, y) \end{bmatrix}, \quad L^0 = \begin{bmatrix} L_1^0(x, y) \\ \vdots \\ L_M^0(x, y) \end{bmatrix}$$

Then, L is computed as $L^0$+Null(Z)R where Null(Z) denotes a matrix having columns that form a basis for the null space of the matrix Z and R denotes a vector that is calculated by minimizing a function, optionally with one or more constraints, for example as described above. Optionally, the function is minimized according to a distance from a given point, for example as follows:

Equation 6:

$$R = \min_{\hat{R}}(\|L^0 + \text{Null}(Z)\hat{R} - P\|_2) = pinv(\text{Null}(Z)) * (P - L^0)$$

For example, the point P is selected to have value 0.5 in all coordinates. It should be noted that both Null(Z) and the pseudo inverse of matrix Z may be pre-computed. Then, the inverted images are updated by projecting their pixel values to a domain of printable values, for example between 0 and 255 to 8 bit images. Pixel values which were not in the domain of printable values are marked as suspect artifact locations.

Figure 5:
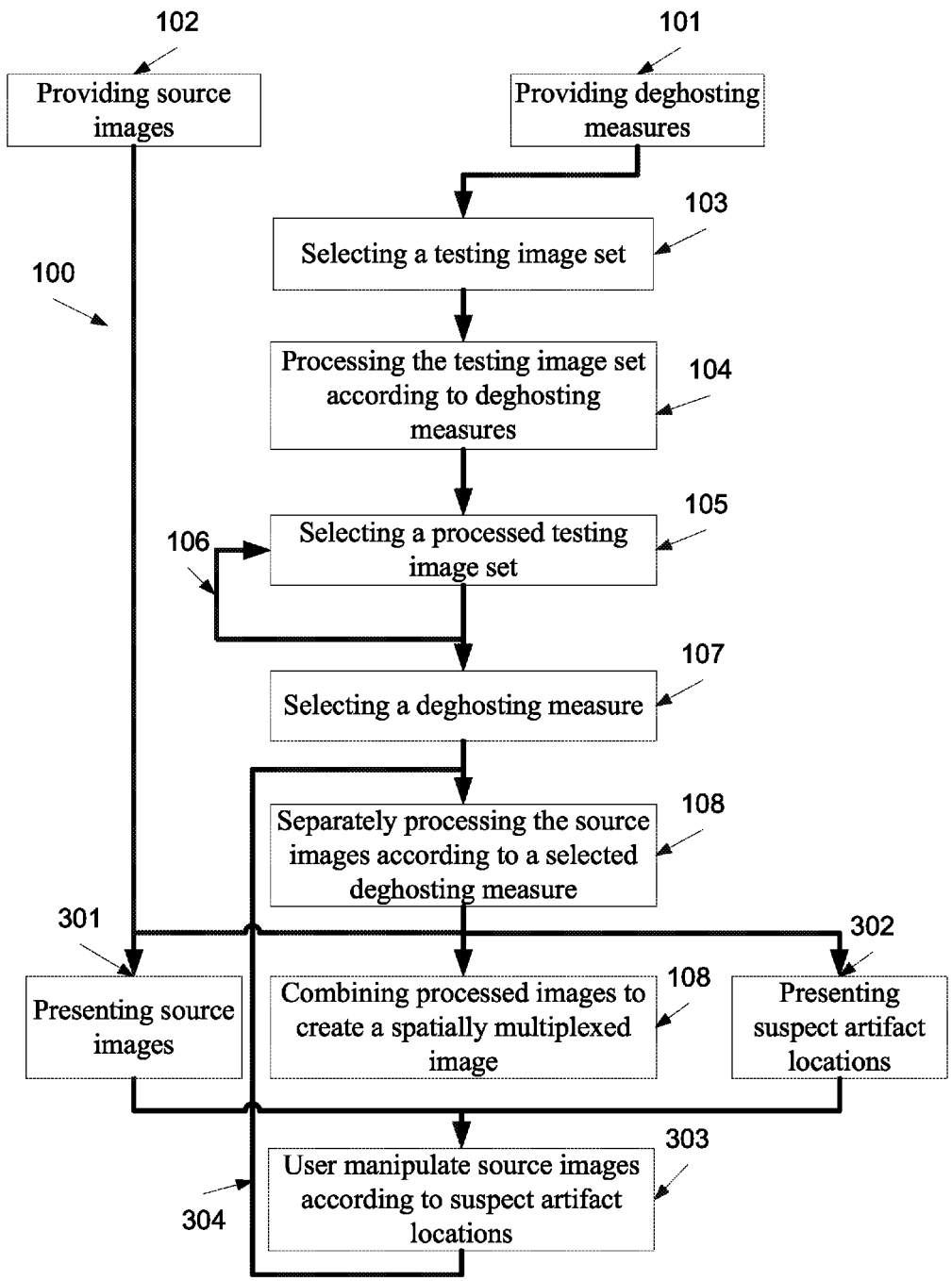
FIG. 5 is a flowchart of a method for allowing a user to refine manually source images which are interlaced to create a spatially multiplexed image, according to some embodiments of the present invention.

Reference is now made to FIG. 5, which is a flowchart of a method for allowing a user to refine manually source images which are interlaced to create a spatially multiplexed image, according to some embodiments of the present invention. Blocks 101-109 are as depicted on FIG. 1, however blocks 301-304 depicts an interactive process, optionally iterative, in which the user refines the source images. In this method, a content manipulation is applied on the source images $I_1 \ldots I_M$ by a user, referred to herein as a content designer.

As shown at 301, the source images are presented to the content designer, for example by a user interface, such as a GUI that is executed on a client terminal.

In addition, as shown at 302, one or more suspect artifact locations are marked on the source images. Optionally, a binary image that indicates the suspect artifact locations is presented to the user. Optionally, the GUI has a preview mode that allows presenting $I_1 \ldots I_M$ source images to the user and guidance, such as visual guidance or audio guidance, guides the user which areas to correct on the source images. Optionally, the visual guidance is provided by highlighting these areas and the audio guidance is provided by vocal instructions that direct the user to these areas.

Optionally, the suspect artifact locations are selected according to outcome of the processing that is described in relation to 108. In such an embodiment, the processed source images $L_1 \ldots L_M$ are computed according to matrix A of Equation 2.

Optionally, the suspect artifact locations are divided and/or classified according to there values, for example according to an estimation of a required correction. For example, the suspect artifact locations are divided to three subsets, a subset $FC=FC_1, \ldots, FC_M$ that includes pixel values which require a general change, a subset $FA=FA_1, \ldots, FA_M$ that includes pixel values which require a pixel value addition, and a subset $FS=FS_1, \ldots, FS_M$ that includes pixel values which require a pixel value subtraction. Optionally, each one of these suspect artifact locations is marked differently, for example with different color and/or sign.

Optionally, $FI1, \ldots, FC_M, FA_1, \ldots, FA_M,$ and/or $FS_1, \ldots, FS_M$ are computed according to Equation 8 Combined with Equation 7:

$$\begin{bmatrix} D_1(x,y) \\ \vdots \\ D_M(x,y) \end{bmatrix} = \begin{bmatrix} I_1(x,y) \\ \vdots \\ I_M(x,y) \end{bmatrix} - A \begin{bmatrix} LL_1(x,y) \\ \vdots \\ LL_M(x,y) \end{bmatrix} \quad \text{Equation 7}$$

$$FC_j(x,y) = \begin{cases} 1 & |D_j(x,y)| > t \\ 0 & \text{otherwise} \end{cases} \quad \text{Equation 8}$$

$$FS_j(x,y) = \begin{cases} D_j(x,y) & D_j(x,y) > 0 \\ 0 & \text{otherwise} \end{cases}$$

$$FA_j(x,y) = \begin{cases} -D_j(x,y) & D_j(x,y) < 0 \\ 0 & \text{otherwise} \end{cases}$$

where t is a threshold, for example t=1 for 8-bit images.

The user suspect artifact locations may be presented as a single mask image showing which areas has to be manipulated to reduce contrast among the different views. The mask is optionally created as follows:

$$\text{Mask}(x,y) = \bigvee_j FC_j(x,y) \quad \text{Equation 9}$$

where $\vee$ denotes a pixelwise operation applied on all the $FC_j$ images. In another embodiment, $FA_1, \ldots, FA_M$ and $FS_1, \ldots, FS_M$ are presented to the content designer with suggested value which is indicative on a recommended subtraction and/or addition.

Now, as shown at 303, optionally the GUI allows the content designer to manipulate the indicated areas. Optionally, the user indicates, in each one of the processed source images, which areas should be manipulated by using the man machine interface (MMI) of the client terminal, for example the mouse and/or the keyboard. For example, the user may change color and/or brightness values of objects and/or areas in the source images and/or reduce contrast therefrom. Optionally, the user changes the location of one or more objects in one or more source images, for example by action such as mark, drag and drop. Optionally, the user changes the images so as to add intensity and/or color values to one or more source processed source images, for clarity denoted as $FA_k>0$. Optionally, the user changes the images so as to subtract intensity and/or color values to one or more processed source images, for clarity denoted as $FS_h>0$, for example according to the values in $FS_k$. Such an addition and/or subtraction may be performed with values which are approximately equal to and/or bounded by the intensity and/or color values.

Optionally, each one of the source images is iteratively presented to the user with respective suspect artifact locations so as to allow her to manipulate separately the images which are about to be interlaced.

Now, as shown at 304, the manipulated source images are processed as the source images, similarly to the described in relation to 108. The process described in 301-304 may be repeated a plurality of times, optionally according to the user's demand.

It should be noted that the mask generated in Equation 10 may be used for improving other methods for reducing ghosting artifacts, for example with the method described in International Application No. PCT/IL2008/000237 filed Feb. 25, 2008, which is incorporated herein by reference. Such an exemplary improvement may be performed, iteratively, as follows:

$$I^{(0)} = I$$

$$I^{(j+1)} = I^{(j)} + s \cdot g(I - f(I^{(j)}))$$

where f denotes a convolution kernel of a blur profile, g denotes a blur operator that is optionally be equal to f, and s denotes a size which is defined to maintain the interlaced image in a predefined range, for example between 0 and 255 for a 8-bit image. Optionally, g=f if f is symmetrical. In such an embodiment, suspect artifact locations which are marked in $FI1, \ldots, FC_M, FA_1, \ldots, FA_M, FS_1, \ldots, FS_M$ and/or any combination and/or subsets thereof are computed according to Equation 8 and $D_j$ images are computed by de-interlacing the error in the last iteration e:

$$e = I - f(I^{(j+1)}) \quad \text{Equation 11:}$$

Optionally, this process iteratively repeated to allow the user to refine and/or to check the correction.

Figure 6:
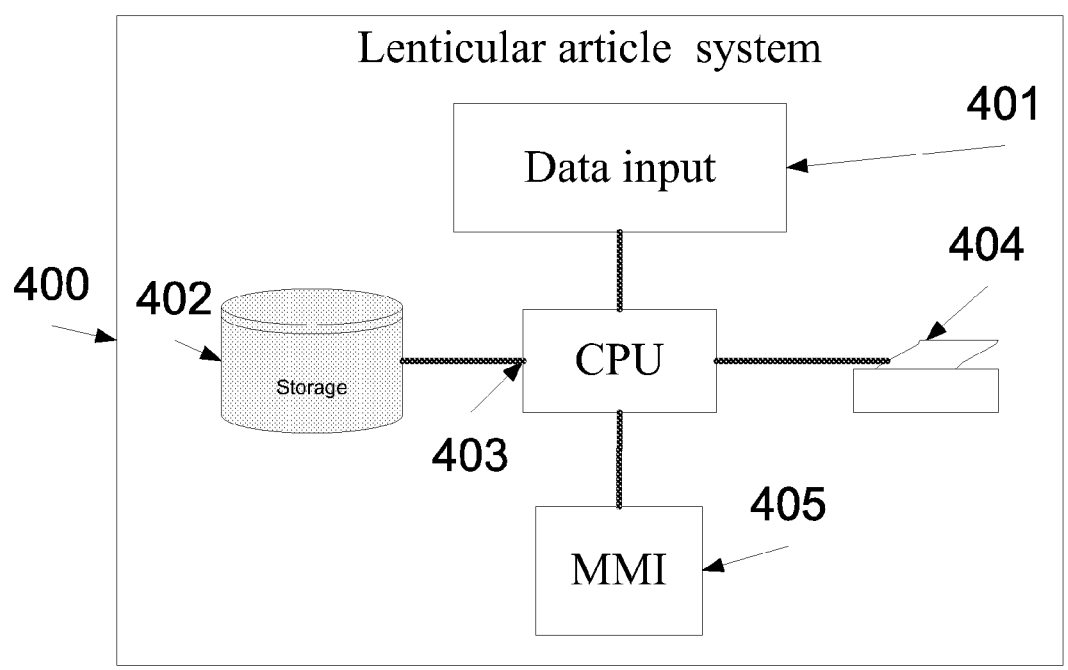
FIG. 6 is a schematic illustration of a system for creating a spatially multiplexed image for an article of lenticular imaging, according to some embodiments of the present invention.

Reference is now made to FIG. 6, which is a schematic illustration of a system 400 for creating a spatially multiplexed image for an article of lenticular imaging, according to some embodiments of the present invention. The system comprises a data input unit 401, such as a communication port and/or a communication interface for receiving and/or selecting the source images, for example as described above. Optionally, the system 400 is implemented on a client terminal, for example as defined above. The system further comprises and/or connected to a storage 402 for storing one or more deghosting measures, each designed to reduce a different blur profile of a different blurring transformation, for example as described above. The system 400 further includes a processing unit 403 for processing of received and/or selected source images according to one of the deghosting measures, which is optionally selected as described above and for interlacing the plurality of processed source images so as to form a spatially multiplexed image. In addition, the system 400 includes a printing unit 404, such as an inkjet printer and a laser printer, and a photo lab for processing film images for printing the spatially multiplexed image. This allows preparing a lenticular imaging article by attaching an optical element to the printed spatially multiplexed image. Optionally, the system 400 includes an MMI for allowing a user to participate in the deghosting measure selection and/or to manipulate the source images, for example as described above.

For clarity, the methods and systems provided above are related to the creation of both printed and digital 3D display lenticular articles. With digital display lenticular articles, the spatially multiplexed image is displayed rather than printed and the lenticular element is designed for 3D display.

It is expected that during the life of a patent maturing from this application many relevant apparatus, methods, and systems will be developed and the scope of the terms sequence, image sensor and image capturing is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for preparing an article of lenticular imaging, comprising:
    receiving a plurality of source images;
    superimposing at least one deghosting element on said plurality of source images, said deghosting element being formed to reduce an estimated ghosting artifact from the article;
    interlacing said plurality of processed source images so as to form a spatially multiplexed image; and
    preparing the article by attaching an optical element to said spatially multiplexed image;
    wherein said superimposing comprises:
    a) providing a testing image set and a plurality of deghosting measures each defined to reduce a blur profile of a different of a plurality of blurring transformations;
    b) processing said testing image set with each said deghosting measure so as to create a plurality of processed testing image sets;
    c) selecting a processed testing image set of said plurality of processed testing image sets;
    d) identifying a deghosting measure being used for creating said selected processed testing image set of from said plurality of deghosting measures; and
    e) performing said superimposition according to said identified deghosting measure.

2. The method of claim 1, wherein said superimposing comprises:
    creating a plurality of pixel clusters by clustering pixels from corresponding locations in at least one area of each said plurality of source images;
    applying said deghosting element on said plurality of pixel clusters; and
    reconstructing said plurality of source images from said plurality of pixel clusters so as to create a plurality of processed source images superimposed with said at least one deghosting element.

3. The method of claim 1, further comprising superimposing said at least one deghosting element according to a blur profile defining a blurring transformation.

4. The method of claim 1, wherein said selecting comprises:
    presenting said plurality of processed testing image sets to a user; and allowing a user to manually select one of said plurality of processed testing image sets.

5. The method of claim 1, wherein said selecting comprises:
capturing a plurality of image sets each of one of said plurality of processed testing image sets; and
automatically selecting said processed testing image set according to a discrepancy thereof from a characteristics of respective of said plurality of image sets.

6. The method of claim 1, wherein said providing comprises iteratively repeating a)-d) with a plurality of additional deghosting measures selected according to said identified deghosting measure.

7. The method of claim 1, wherein said superimposing comprises separately processing each color channel of said plurality of source images according to said deghosting measure.

8. The method of claim 1, further comprising:
identifying at least one suspect artifact location in at least one of said plurality of source images according to said superimposing,
presenting said at least one suspect artifact location to a user, and
manipulating said plurality of source images according to at least one input of said user.

9. The method of claim 8, wherein said presenting comprises guiding said user how to perform said manipulating.

10. The method of claim 8, further comprising repeating said a)-d) with said plurality of manipulated source images.

11. A system for preparing an article of lenticular imaging, comprising:
a data input unit for receiving a plurality of source images;
a processing unit for superimposing at least one deghosting measure on each said source image and for interlacing said plurality of superimposed source images to form a spatially multiplexed image; and
a printing unit for printing said spatially multiplexed image so as to allow the preparing the article by attaching an optical element thereto;
wherein said processing unit performs said superimposing by:
processing a testing image set with each of a plurality of deghosting measures so as to create a plurality of processed testing image sets, each of said plurality of deghosting measures is defined to reduce a blur profile of a different of a plurality of blurring transformations;
selecting a processed testing image set of said plurality of processed testing image sets;
identifying a deghosting measure being used for creating said selected processed testing image set of from said plurality of deghosting measures; and
performing said superimposition according to said identified deghosting measure.

12. The system of claim 11, wherein said at least one deghosting element are generated when applying a deghosting measure generated to reduce a blur profile defining a blurring transformation.

13. The system of claim 12, further comprising a printing unit for printing an effect of a plurality of deghosting measures, each generated according to a different of plurality of profile blurs, to a user and receiving a selection of one of said plurality of profile blurs in response, said processing unit configured for processing said source images according to said selected deghosting measure.

14. The system of claim 12, further comprising a man machine interface (MMI) for presenting at least one suspect artifact in at least one of said plurality of source images and receiving a user manipulation in response, said processing unit configured for processing said source images according to said user manipulation.

* * * * *